United States Patent Office 2,940,844
Patented June 14, 1960

2,940,844
COMPOSITIONS AND METHOD FOR INHIBITING THE GROWTH OF PLANTS
Hans Gysin, Basel, and Enrico Knusli, Riehen, near Basel, Switzerland, assignors to J. G. Geigy A.-G., Basel, Switzerland, a Swiss firm
No Drawing. Filed Dec. 18, 1956, Ser. No. 628,957
Claims priority, application Switzerland Dec. 21, 1955
10 Claims. (Cl. 71—2.5)

The present invention relates to new compositions for influencing, and in particular, inhibiting the growth of plants. It also concerns the use of these agents and the active ingredients contained therein to influence the growth of plants.

Surprisingly it has been found that compositions for influencing the growth of plants are obtained by using as active ingredients benzodiazine derivatives corresponding to the formula:

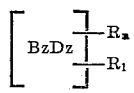

$$\left[ BzDz \begin{matrix} -R_n \\ -R_1 \end{matrix} \right]$$

wherein BzDz represents a benzodiazine selected from the group consisting of cinnoline, quinazoline, phthalazine and quinoxaline, $n$ represents an integer from 1 to 3, R, independently in each occurrence represents a member selected from the group consisting of halogen, alkylamino, dialkylamino, alkoxy, alkenyloxy, alkylmercapto, alkenylmercapto, polymethylenimino and morpholino radicals, alkenylamino and dialkenylamino radicals, and $R_1$ represents a member selected from the group consisting of hydrogen, an amino group and a hydrocarbon radical, in combination with a carrier.

The new compositions are excellently suitable as weed killers as well as for the selective destruction of weeds among cultivated plants and also for the total elimination and inhibition of undesirable plant growth. The word "weeds" here also means undesired cultivated plants, e.g. those which have been previously planted or those which have been planted in neighbouring areas. In addition, the compositions defined above are suitable to effect other inhibitory influences on the plant growth, in particular defoliation, acceleration of ripeness by premature desiccation, e.g. of potato plants, blossom thinning, retardation of blossoming, extension of harvesting time and storing propensities. In suitable concentrations under certain circumstances, the compositions claimed can also be used as agents for promoting the germination or root growth.

Of the compounds as defined above which can be used as active ingredients, the following are named:

4-chloro-cinnoline, 4-amino-cinnoline, 4-morpholino-cinnoline, 4-ethylamino-cinnoline, 4-methoxy-cinnoline.

2.4-dichloro-quinazoline, 2-chloro-4-phenyl-quinazoline, 2-benzyl-4-chloro-quinazoline, 2-chloro-4-amino-quinazoline, 4-ethylamino-quinazoline (M.P. 148–149°), 4-diethylamino-quinazoline (B.P.$_{0.1}$ 1180), 2-chloro-4-ethylamino-quinazoline (M.P. 169–170°), 2-chloro-4-diethylamino-quinazoline (M.P. 76–78°), 2-chloro-4-morpholino-quinazoline, 2-chloro-4-piperidino-quinazoline, 2.4-bis-ethylamino-quinazoline, 2.4-bis-diethylamino-quinazoline, 2 - chloro - 4 - methoxy - quinazoline, 2.4-dimethoxy-quinazoline, 2.4-bis-methyl-mercapto-quinazoline.

2-chloro-quinoxaline, 2-ethylamino-quinoxaline, 2-diethylamino-quinoxaline, 2-chloro - 3 - amino - quinoxaline, 2 - chloro - 3 - ethylamino - quinoxaline (M.P. 73–75°), 2-chloro-3-diethylamino-quinoxaline, 2-chloro-3-morpholino-quinoxaline, 2.3-bis-ethylamino-quinoxaline, 2-ethoxy-quinoxaline, 2-allyloxy-quinoxaline, 2-chloro - 3 - ethoxy-quinoxaline, 2.3-dimethoxy-quinoxaline, 2.3-bis-methylmercapto-quinoxaline.

1-methyl-4-chloro-phthalazine, 1.4-dichloro-phthalazine, 1-phenyl-4-chloro-phthalazine, 1-benzyl-4-chloro-phthalazine, 1-methyl - 4 - ethyl - amino -phthalazine, 1-chloro-4-amino-phthalazine, 1-chloro - 4 - ethylamino - phthalazine, 1-chloro-4-isopropylamino-phthalazine, 1-chloro - 4 - morpholino-phthalazine, 1-chloro - 4 - piperidino - phthalazine, 1.4-bis - ethylamino - phthalazine, 1 - chloro - 4 - methoxy-phthalazine, 1-chloro-4-allyloxy-phthalazine, 1-bromo-4-methoxy-phthalazine, 1-chloro-4-methylmercapto-phthalazine, 1-chloro-4 - ethylmercapto - phthalazine, 1-chloro-4-allylmercapto-phthalazine, 1.4-dimethoxy-phthalazine.

The plant growth influencing compositions according to the invention are either solutions, emulsions, suspensions or dusts according to the intended use. All application forms however, must contain the active substance in fine distribution. In particular, when total destruction of plant growth, premature desiccation or defoliation are desired, the effect can be increased by the use of carriers which are phytotoxic themselves such as, e.g. high boiling mineral oil fractions or chlorohydrocarbons. On the other hand, the selective inhibition of plant growth, e.g. selective weed killing in general, may be better attained by the use of indifferent carriers.

For the production of solutions which are to be sprayed direct, for example mineral oil fractions of a medium to high boiling point such as kerosene or diesel oil, also coal tar oils and oils of vegetable and animal origin as well as cyclic hydrocarbons such as tetrahydronaphthalene and alkylated naphthalenes can be used to which the active ingredients according to the present invention, and, if necessary, also auxiliary solvents such as, e.g. xylene, are added. Solutions in lower boiling solvents such as in particular alcohols, e.g. ethyl alcohol, isopropyl alcohol or methyl cyclohexanol; ketones such as, e.g. acetone or cyclohexanone; hydrocarbons for example benzene, toluene, xylene, also in chlorinated hydrocarbons such as tetrachlorethane, ethylene chloride or trichlorethylene are used less for direct application but rather in combination with suitable emulsifiers for the production of concentrates from which aqueous emulsions can be prepared.

Aqueous application forms are prepared from emulsion concentrates, pastes or wettable powders by the addition of water. To produce emulsions, the substances as such or dissolved in one of the solvents named above, advantageously by means of wetting or dispersing agents, are homogenised in water. Examples of cation active emulsifying or dispersing agents are quaternary ammonium compounds; examples of anion active emulsifying agents are soap, soft soap, aliphatic long chained sulphuric acid monoesters, aliphatic aromatic sulphonic acids, long chained alkoxy acetic acids; polyethylene ethers of fatty alcohols and polyethylene oxide condensation products are examples of non-ionogenic emulsifying agents. Also, concentrates can be produced consisting of active ingredient, emulsifier or dispersing agent and, if necessary, solvent. These are suitable for dilution with water.

Dusts can be produced by mixing or milling together the active substance with a solid carrier. Examples of such are: talcum, diatomaceous earth, kaolin, bentonite, calcium carbonate, boric acid, tricalcium phosphate, or also sawdust, powdered cork or coal, and other substances of vegetable origin. On the other hand, the carriers can be impregnated with solutions of the active ingredient in volatile solvents. Pulverulent preparations and pastes can be made suspendible in water by the addition of wetting agents and protective colloids and used as spraying agents.

The various application forms can be more closely adapted to the intended use in the usual way by the addition of substances which improve the distribution, the adhesive properties, resistance to rain and, possibly, the resorption. Such substances are, e.g. fatty acids, resins, wetting agents, glue, casein or alginates. In the same way the biological activity can be broadened by the addition of substances having a bactericidal or fungicidal action or of substances which also influence the growth of plants, as well as fertilisers. Active ingredients having a basic character can also be used in the form of their salts with suitable acids.

Typical forms of application are given in the following examples:

Example 1

80 parts of active ingredient, e.g. 2-chloro-3-ethylamino-quinoxaline, are ground in a suitable ball mill to the greatest degree of fineness with 19.5 parts of solid inert carrier, e.g. kaolin or calcium carbonate, and 0.5 part of adhesive agent, e.g. carboxymethyl cellulose or polyvinyl alcohol. The mixture serves as a dusting agent.

Example 2

20 parts of active ingredient, e.g. 2-chloro-4-ethylamino-quinazoline, are finely ground in a Kolloplex mill with 70 parts of pulverulent inert carrier, e.g. talcum or chalk, 7 parts of a suitable wetting agent such as an alkyl naphthalene sulphonic acid and 3 parts of a protective colloid, e.g. concentrated sulphite waste liquor. The powder obtained is made into spraying agents by suspending in water in a concentration of 1 to 10%.

Example 3

5 parts of active ingredient, e.g. 4-diethylamino-quinazoline, are dissolved in 90 parts of a liquid carrier, i.e. an organic solvent such as xylene and 5 parts of a non-ionogenic emulsifier, e.g. the condensation product of ethylene oxide and an alkyl phenol, are added. The solution is mixed in the desired proportion with water and forms a milky emulsion.

Example 4

10 parts of active ingredient, e.g. 4-diethylamino-quinazoline, are dissolved in 90 parts of spindle oil. The solution so obtained may be applied directly to the plants.

Example 5

An aqueous emulsion containing 10 parts of active ingredient, e.g. 2-chloro-4-ethylamino-quinazoline, is mixed with 90 parts of crystallised ammonium sulphate. The moist mass is granulated, e.g. by pressing through a sieve. The grains obtained are dried and separated from pulverulent particles by sieving. The granulate produced in this way is suitable for strewing.

Example 6

2-chloro-3-ethylamino-quinoxaline used in the form of a dusting agent (containing 10% active ingredient and 90% of talcum as carrier) causes complete foliation of young cotton plants within one week after the application.

Example 7

Strong burning of the leaves of young oat, mustard and cotton plants is caused within 7 days by 4-diethylamino-quinazoline used as a 0.5% spraying agent. 2-chloro-4-ethylamino-quinazoline has the same action on oats and mustard plants but does not affect cotton plants.

What we claim is:

1. Compositions for inhibiting the growth of plants comprising an active ingredient a benzodiazine derivative corresponding to the formula:

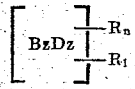

wherein BzDz represents a benzodiazine selected from the group consisting of cinnoline, quinazoline, phthalazine and quinoxaline, $n$ represents an integer from 1 to 3, R independently in each occurrence, represents a member selected from the group consisting of chlorine, lower alkylamino, lower dialkylamino, lower alkoxy, lower alkenyloxy, lower alkylmercapto, lower alkenylmercapto, piperidino and morpholino radicals, and $R_1$ represents a member selected from the group consisting of hydrogen, an amino group, a lower alkyl, a phenyl and a benzyl radical in an amount and concentration sufficient to inhibit the growth of plants, and a solid, pulverulent carrier.

2. A composition for inhibiting the growth of plants comprising as active ingredient the compound 2-chloro-3-ethylamino-quinoxaline in an amount and concentration sufficient to inhibit the growth of plants, and a solid, pulverulent carrier.

3. A composition for inhibiting the growth of plants comprising as active ingredient the compound 2-chloro-4-ethylamino-quinazoline in an amount and concentration sufficient to inhibit the growth of plants, and a solid pulverulent carrier.

4. A method of inhibiting the growth of plants which comprises bringing into contact with at least a part of the structure of said plants a benzodiazine derivative corresponding to the formula:

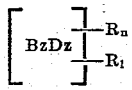

wherein BzDz represents a benzodiazine selected from the group consisting of cinnoline, quinazoline, phthalazine and quinoxaline, $n$ represents an integer from 1 to 3, R, independently in each occurrence, represents a member selected from the group consisting of chlorine, lower alkylamino, lower dialkylamino, lower alkoxy, lower alkenyloxy, lower alkylmercapto, lower alkenylmercapto, piperidino and morpholino radicals, and $R_1$ represents a member selected from the group consisting of hydrogen, an amino group, a lower alkyl, and a phenyl and a benzyl radical, in an amount and concentration sufficient to inhibit the growth of the plants.

5. A method of inhibiting the growth of plants which comprises bringing into contact with at least a part of the structure of said plants the compound 2-chloro-3-ethylamino-quinoxaline, in an amount and concentration sufficient to inhibit the growth of the plants.

6. A method of inhibiting the growth of plants which comprises bringing into contact with at least a part of the structure of said plants the compound 2-chloro-4-ethylamino-quinazoline, in an amount and concentration sufficient to inhibit the growth of the plants.

7. A composition for inhibiting the growth of plants comprising an active ingredient the compound 2-chloro-3-diethylamino-quinoxaline in an amount and concentration sufficient to inhibit the growth of plants, and a solid, pulverulent carrier.

8. A composition for inhibiting the growth of plants comprising as active ingredient the compound 1-chloro-4-methoxy-phthalazine in an amount and concentration sufficient to inhibit the growth of plants, and a solid, pulverulent carrier.

9. A method of inhibiting the growth of plants which comprises bringing into contact with at least a part of the structure of said plants the compound 2-chloro-3-diethylamino-quinoxaline, in an amount and concentration sufficient to inhibit the growth of the plants.

10. A method of inhibiting the growth of plants which comprises bringing into contact with at least a part of the structure of said plants the compound 1-chloro-4-methoxy-phthalazine, in an amount and concentration sufficient to inhibit the growth of the plants.

References Cited in the file of this patent

UNITED STATES PATENTS

| | | |
|---|---|---|
| 2,537,871 | Wolf | Jan. 9, 1951 |
| 2,594,381 | Beber | Apr. 29, 1952 |
| 2,811,523 | Rigterink | Oct. 29, 1957 |